(12) United States Patent
Grob-Lipski

(10) Patent No.: US 7,889,653 B2
(45) Date of Patent: Feb. 15, 2011

(54) METHOD, OUTPUT UNIT, AND TERMINAL FOR RECONSTRUCTING NON-CONTINUOUS PACKETIZED DATA

(75) Inventor: Heidrun Grob-Lipski, Starzach (DE)

(73) Assignee: Alcatel, Paris (FR)

( * ) Notice: Subject to any disclaimer, the term of this patent is extended or adjusted under 35 U.S.C. 154(b) by 2742 days.

(21) Appl. No.: 10/397,168

(22) Filed: Mar. 27, 2003

(65) Prior Publication Data
US 2003/0185246 A1 Oct. 2, 2003

(30) Foreign Application Priority Data
Mar. 28, 2002 (EP) .................... 02360111

(51) Int. Cl.
*G01R 31/08* (2006.01)
(52) U.S. Cl. .............. 370/230.1; 370/235; 370/401; 370/352
(58) Field of Classification Search .......... 370/230.1, 370/235, 352, 353, 356, 400, 401, 503, 507–509, 370/516–519; 375/356, 359, 371; 709/224–229
See application file for complete search history.

(56) References Cited

U.S. PATENT DOCUMENTS

| 4,771,250 | A | * | 9/1988 | Statman et al. .............. 331/17 |
| 5,623,483 | A | * | 4/1997 | Agrawal et al. ............. 370/253 |
| 6,259,677 | B1 | | 7/2001 | Jain |
| 6,304,551 | B1 | * | 10/2001 | Ramamurthy et al. ....... 370/232 |
| 7,079,486 | B2 | * | 7/2006 | Colavito et al. ............. 370/231 |
| 2002/0009054 | A1 | * | 1/2002 | Suzuki et al. ............... 370/252 |
| 2003/0058792 | A1 | * | 3/2003 | Shao et al. .................. 370/229 |

FOREIGN PATENT DOCUMENTS

WO   WO 0133787 A1   5/2001

OTHER PUBLICATIONS

P. Agrawal et al, "Use of statistical methods to reduce delays for media playback buffering", Multimedia Computing and Systems, 1998, Proceedings. IEEE International Conference on Austin, TX, USA 28, Jun. 28-Jul. 1, 1998, Los Alamitos, CA, IEEE Comput. Soc., US, Jun. 28, 1998, pp. 259-263, XP010291583.

* cited by examiner

*Primary Examiner*—Ian N Moore
(74) *Attorney, Agent, or Firm*—Sughrue Mion, PLLC

(57) ABSTRACT

Provided is a method for reconstructing non-continuous packetized data of a continuous data stream from a data connection into a reconstructed continuous data stream at the receiving point of a packet-based network, the method including gathering measurements of the data connection; predicting at least one value characterizing the data connection based on the gathered measurements using an estimation method; evaluating a de-jittering delay for the data connection based upon the at least one value characterizing the data connection; and delaying and converting the data packets based on the evaluated de-jittering delay.

20 Claims, 6 Drawing Sheets

Figure 5: PROGRAM

DECLARATION    Channel: Input
                         Stream: Output
                         PriorityQueue: Buffer

DATA TYPE Channel
       Boolean:End()                       ... returns true if the stream ends
       Packet:Fetch()                     ... gets the next arrived packet
END DATA TYPE Channel

DATA TYPE Stream
       Append(Element)   ... adds a data element to a stream
       Element:Read()                    ... gets the next data element
END DATA TYPE Stream

DATA TYPE PriorityQueue
       Add(Element)               ... add a packet to this priority queue
       Element:Get()           ... returns and deletes the least element of this queue
       Boolean:IsEmpty()      ... returns true if the queue is empty
       Integer:Size()                ... returns the size of a queue
END DATA TYPE PriorityQueue

IMPLEMENTATION

PROCESS Receive                                  ... grabs the input channel
       WHILE (NOT Input.end()) DO
           packet = Input.Fetch()                 ... fetch each packet
           *Estimation.Measure(packet)*      *... measure network performance*
           Buffer.Add(packet)                   ... queue the packet
       END WHILE
   END PROCESS Receive

PROCESS Stream                                  ... streams the data continuously
       WHILE (NOT (Input.End() AND Buffer.isEmpty())) DO
           *Estimation.Predict(BufferSize, DelayTime);*
           WHILE(Buffer.Size()<*BufferSize*) WAIT END WHILE    ... wait for filled buffer
           WHILE (NOT Buffer.isEmpty()) DO
               Output.Append(Buffer.Get())             ... empty the buffer
               DELAY(*DelayTime*)
           END WHILE
       END WHILE
   END PROCESS Stream

*CLASS Estimation*
       *Real: mean delay, delay variation, ...*
       *METHOD Measure(packet)*
           *update mean delay, delay variation....*
       *END METHOD*

*METHOD Predict(buffer size, delay time)*
           *buffer size = Characteristic function for buffer size (mean delay, ...)*
           *delay time = constant 0*
       *END METHOD*
   *END CLASS Estimation*

Figure 6:.

CLASS Estimation
    Real: T
    Real: constant sr;
    Real: tr;
    Integer: R;     ... initialized by the number of packets to be streamed
    Integer: n;     ... initialized by 0

METHOD Measure(t)     ... delay time t of the arrived packet
        $T = (n * T + t)/(n+1)$     ... updated mean delay time T
        $n = n + 1;$     ... update number of received packets
        $R = R - 1;$     ... updated number of packets to be streamed R
    END METHOD

METHOD Predict(B, 1/sr)     ... estimated buffer size B
        ... constant time for streaming one packet sr
        $tr = 1/T$     ... the mean transmission rate tr
        $B = sr/tr * R - R$     ... the predicted buffer size B
    END METHOD
END CLASS Estimation

METHOD, OUTPUT UNIT, AND TERMINAL FOR RECONSTRUCTING NON-CONTINUOUS PACKETIZED DATA

FIELD OF THE INVENTION

This invention relates to a method for reconstructing non-continuous packetized data of a continuous data stream like streamed media, voice, audio, or video from a data connection into a continuous data stream at the receiving point of a packet-based network as well as, an output unit, a terminal, and computer program products therefore.

The invention is based on a priority application No. 02 360 111.5, which is hereby incorporated by reference.

BACKGROUND OF THE INVENTION

Many sophisticated emerging applications, such as voice over IP, multimedia conferencing, or distributed virtual reality, are difficult to deploy in todays internetworking infrastructure. This is mainly due to one requirement that all these applications share the need for guaranteed real-time service. These applications not only require high bandwidth, but predictable quality of service (QoS) such as jitter delay as well.

The QoS requirements at network level are typically specified in terms of bounds on worst-case end-to-end delay on the worst-case packet loss rate and on the worst-case delay jitter for packets of the connection. Other parameters may be specified as well, such as deadline miss rate. The desired delivery time for each message across the network is bounded by a deadline, a specific maximum delivery delay. This delay bound is an application-layer, end-to-end timing constraint.

If a message arrives after the deadline is expired, the message is useless and is typically discarded. For many real-time applications, it is not important how fast a message is delivered. Indeed, packets arriving early may need to be buffered at the receiver to achieve constant end-to-end delay. Therefore, delay jitter, which is the variation in delay experienced by packets in a single connection, is a critical performance metric. For example, in video transmission, jitter may cause some frames to arrive early, and others to arrive late. Although the transmission of all frames satisfies the deadline requirement, the displayed movie may appear jittery. Same applies to streamed audio data.

Buffers at the receiver can be used to control delay jitter. The amount of buffer space required can be determined from the peak rate and the delay jitter of the delivery process and can be quite large for a network with no control of delay.

Important quality of services are especially delay jitter, delay, and packet loss. Delay jitter and packet loss obstructs proper reconstruction at the receiver whereas delay impairs interactivity.

The following section contains definition for the notions of streams, packets, and channels.

Streamed data is a data sequence that is transmitted and processed continuously. Streaming is the process of continuously appending data to a data stream.

A packet is a piece of data consisting of a header and a payload information. Packetizing is the process of decomposing data into a set of (small) packets, where the header is used to store information for reconstruction, e.g. a sequence number.

A data channel is a connection between two network units that is able to transport data.

Delay is the time between sending and receiving a packet. Delay jitter is the variation in delay. Packet loss is an infinite delay.

A common, used technique for streamed data is to use a buffer at the receiver for reducing delay jitter and packet loss against an increased overall delay. Hence there is a demand for optimization. Especially real-time streamed data, like video or audio streams, needs to be on-line processed, i.e., with small delay and small jitter delay.

A well known algorithm to solve this problem is to buffer streamed data and to replay the buffer at a constant speed to absorb delay variations and play-out packets at fixed deadline, called jitter absorption. Packets received after deadline are discarded.

A more sophisticated algorithm is to monitor delay and/or delay variation and adapt play-out time accordingly, called jitter adaptation. An application might then slow down play-out when delay increases to avoid loss and speed up play-out when delay decreases to reduce delay.

It is object of the invention to provide a method for reducing delay jitter, delay, and packet loss for streamed data connections.

SUMMARY OF THE INVENTION

The present invention is a method for reconstructing non-continuous packetized data of a continuous data stream like streamed media, voice, audio, or video from a data connection into a continuous data stream at the receiving point of a packet-based network, comprising the steps of providing of at least one estimation method based on at least one characteristic value concerning data connections of the kind intended for, gathering measurements of at least one value characterizing the data connection, evaluating a de-jittering delay for the data connection by predicted parameters taking into account the at least one provided value and the at least one gathered value, delaying and converting the data packets following the evaluated de-jittering delay.

The invention also relates to an output unit, a terminal, and computer program products for a terminal and for an output unit.

The essential idea of the invention is iterative gathering network observations for a statistical prediction of network behavior, and adapting iterative said converting method according to said prediction. The present invention uses a continuous optimization for adapting the parameters of a conversion method. This optimization decomposes into three steps. Continuously gathering network observations, i.e. quality of service measurements, deriving a statistical prediction from these network observations, and adapting the parameters of the conversion method according to said prediction.

BRIEF DESCRIPTION OF THE DRAWINGS

FIG. 5. shows a computer program for streamed data reconstruction according to the invention.

FIG. 6. shows an "Estimation" class for a computer program for streamed data reconstruction according to the invention.

DETAILED DESCRIPTION OF THE INVENTION

Figure 1:
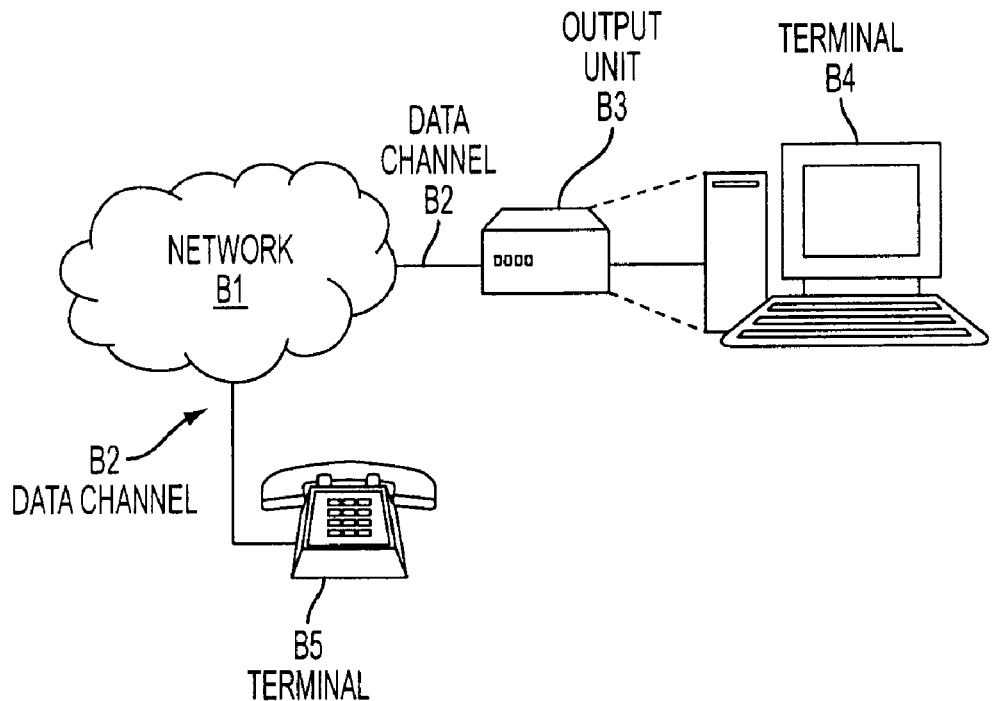
FIG. 1. shows a network, terminals, an output unit, and the context of streamed data reconstruction according to the invention.

FIG. 1 shows of a network B1 two data channels B2, an output unit B3, and two terminals, a computer terminal B4 and a telephone terminal B5. The terminal B4 has an output unit B3. This output unit B3 is connected via a data channel B2 with a network B1. The telephone terminal B5 is as well connected with the network B1 via a data channel B2.

The figure describes the scenario for this realization. Both terminals B4, B5, in the role of a receiver, are connected with the network B1 via data channels B2. The terminals receive packets over the data channels and these packets contain streamed data, which has to be reconstructed. To be able to reconstruct the data stream, there might be a special hardware, called output unit B3, that alternatively might be integrated in the terminal. The terminal and the output unit are assumed to be controlled by a computer program. Although the realization of the reconstruction method could also be implemented in software only.

Figure 2:
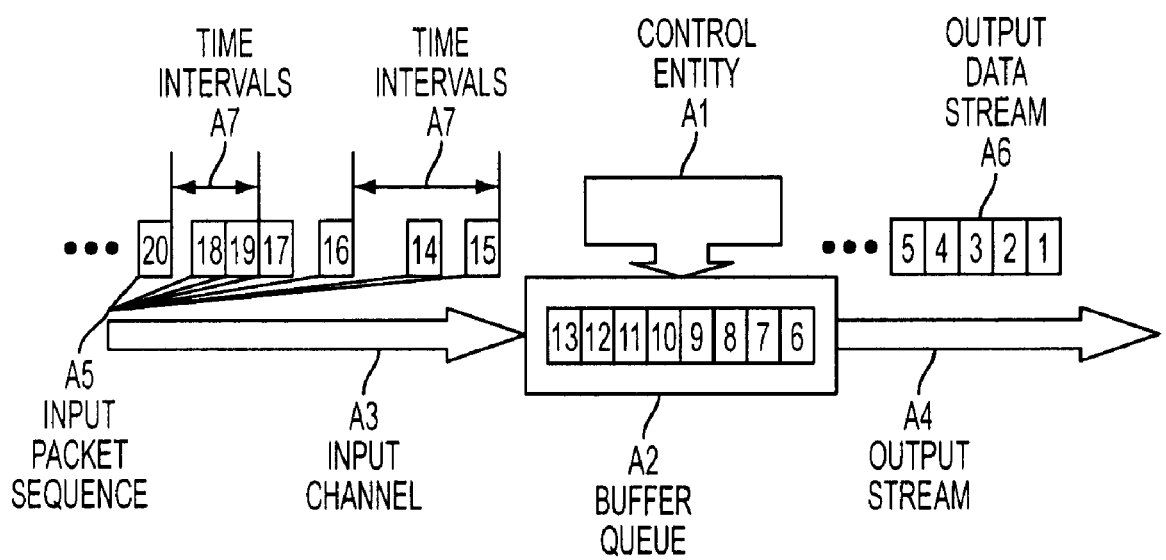
FIG. 2. shows the phases of reconstructing streamed data out of a packet stream according to the invention.

FIG. 2 shows a control entity A1, a buffer queue A2, an input channel A3, an output stream A4, an input packet sequence A5, an output data stream A6 and an illustration of two time intervals A7 between two consecutive packets also-known as packet inter-arrival times.

The control entity A1 controls the buffer queue A2, i.e. when the queue has to be emptied and filled. The buffer queue A2 is connected with the input channel A3 transporting the input packet sequence A5. The input packet sequence A5 consists of a sequence of packets A5, where each packet having a packet sequence number 15, 16, . . . , 20. This input packet sequence A5 needs not coinciding with the packet number sequence as illustrated in the drawing. The figure does not show the packet representation, i.e. header, payload, etc. It is assumed that the payload is already extracted and labeled by the sequence number. The figure shows especially the time intervals A7 between the consecutive packets 19 and 20 as well as the time intervals A7 between the consecutive packets 15 and 16. The buffer queue A2 is also connected with the output stream A4 transporting the ordered continuous output data stream A6. The output stream is ordered by packet numbers and the time interval between two consecutive packets disappears, by using the previously buffered reservoir.

In the illustrated configuration the output stream data carries data from packets 1, 2, 3, 4, 5, the buffer queue A2 stores packets 6, 7, 8, 9, 10, 11, 12, 13, and the input channel data AS consists of the packets 15, 14, 16, 17, 19, 18, 20.

The figure illustrates the functionality of reconstructing a data stream. A jittered input data stream running into a buffer, converted into a continuous output data stream. The arriving packets, each having its number, are translated into an ordered continuous data stream where the data is ordered by the packet numbers and the time interval between the content of two consecutive packets disappears. In the example it is assumed that the packet stream has a jitter and the packets need not arrive in the origin sequence. The network might have additional characteristics, e.g. an asserted delay bound that should be taken into account when implementing the described functionality. In further, it is assumed that there is no packet loss. In case of packet loss additional strategies have to be considered beside buffering, e.g., reconstruction of packet information on the application layer or depending if network resources and time are available an additional request for retransmission.

Figure 3:
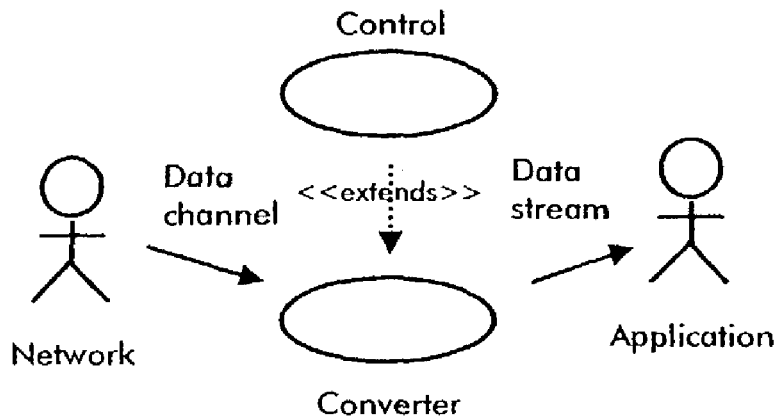
FIG. 3. shows a use case diagram according to the UML notation describing the boundaries of the method for streamed data reconstruction according to the invention.

FIG. 3 shows a use case diagram according to the UML notation, from the 'Unified Modeling Language User Guide', G. Booch, J. Rumbaugh, I. Jacobson, Addison-Wesley, Reading Mass., 1999, pages 233-236, containing the actors "Network" and "Application", as well as a use case "Converter" and a use case "Control".

The "Network" is associated with the "Converter" by "Data channel" and the "Application" is associated with the "Converter" by "Data stream". The "Converter" is extended by the "Control".

The diagram shows the problem context, namely the data channel "Data channel" supporting the jittered packet data stream shown in FIG. 2, and a application "Application" requesting the reconstructed continuous streamed data. This reconstruction is performed by a controlled converter "Converter" extended by "Control". The control mechanism is explicitly stated. It might be hidden by other use cases as side effects, e.g. a scheduler integrated in an operating system.

Figure 4:
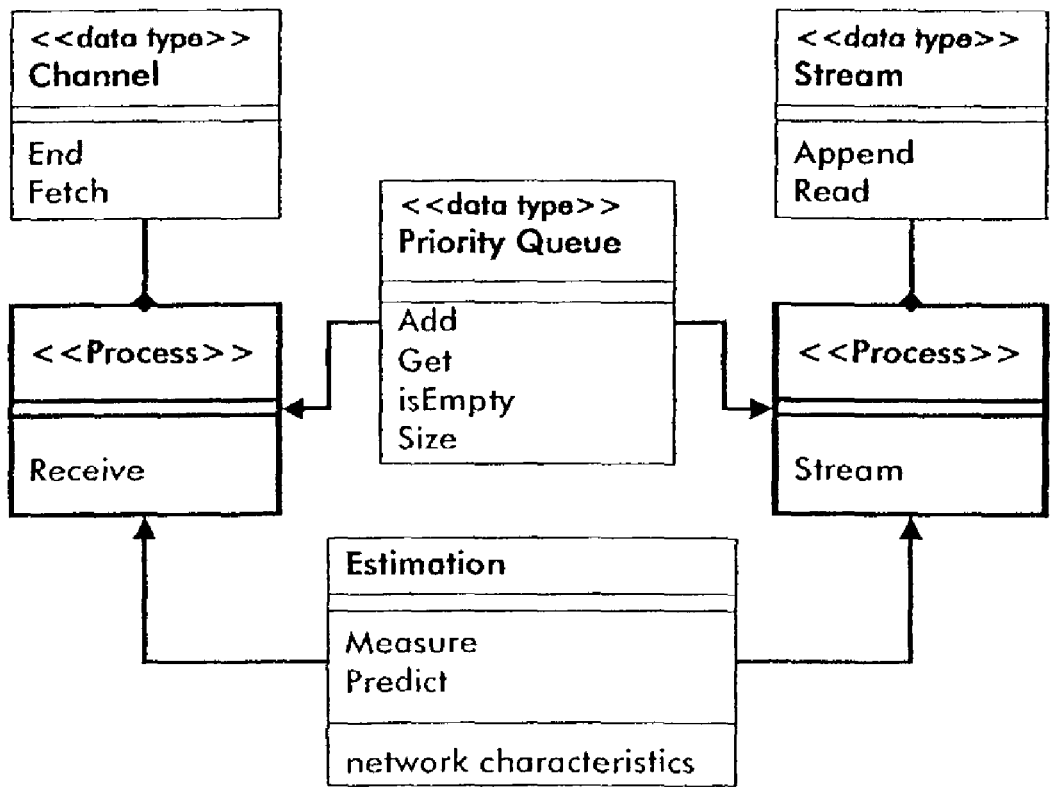
FIG. 4. shows a class diagram according to the UML notation describing an architecture of computer program for streamed data reconstruction according to the invention.

FIG. 4 shows a class diagram according to the UML Notation, from the 'Unified Modeling Language User Guide', G. Booch, J. Rumbaugh, I. Jacobson, Addison-Wesley, Reading Mass., 1999, pages 105-108, containing the data types "Channel", "Stream", and "PriorityQueue"; the processes "Receive" and "Stream"; and a class "Estimation".

"Channel" provides the two methods "End" and "Fetch". "Stream" provides the two methods "Append" and "Read". "PriorityQueue" provides four methods "Add", "Get", "IsEmpty", and "Size". "Estimation" provides the two methods "Measure" and "Predict".

The diagram shows an architecture for streamed data reconstruction. This architecture has a framework character. It is designed for illustration purposes. It allows to substitute the estimation and to simplify the description by abstraction. An architecture of a realization is influenced by the complete product design.

The architecture consists of three abstract data types, a channel, a stream and a priority queue, as well as two processes, "Receive" and "Stream". The priority queue is chosen to illustrate the abstract buffering mechanism. It is not necessary to use abstract data types. For instance, a often used technique instead of a priority queue is a straight forward array implementation of a buffer queue.

The processes need not to be explicitly designed. Instead one might realize the method by threads or operating system services.

The data type "Channel" is aggregated by the process "Receive". The data type "Stream" is aggregated by the process "Stream". The data type "PriorityQueue" and the class "Estimation" are both associated to both processes "Receive" and "Stream".

The method "End" of the data type "Channel" returns the Boolean true when the last packet of the packet sequence has arrived, the Boolean false otherwise. The method "Fetch" returns the next received packet.

The method "Append" of the data type "Stream" appends the argument to the end of this stream. The method "Read" reads the head of this stream (destructive).

The method "Add" of the data type "PriorityQueue" enters the argument into this priority queue.

The method "Get" returns the least element of this priority queue. The method "isEmpty" returns the Boolean true if this priority queue contains no element, the Boolean false otherwise. The method "Size" returns the number of elements contained in this priority queue.

The method "Measure" of the class "Estimation" collects network performance information and updates network characteristics accordingly. The method "Predict" returns values for controlling the behavior of the two processes. The two processes are controlled by the class "Estimation" that measures network behavior and derives network performance predictions. The two processes "Receive" and "Stream" use this prediction in order to adapt their behavior, e.g. the use of the buffer queue or the stream speed etc.

FIG. 5 shows a program implementing the architecture for streamed data reconstruction of FIG. 4.

The abstract notation for the program consists of a declaration part for variables and types, labeled by 'DECLARATION' and an implementation part labeled by 'IMPLEMENTATION'.

The variable declaration part consists of three objects:
"Input", a "Channel",
"Output", a "Stream", and
"Buffer", a "PriorityQueue".

The type declaration part consists of three data types:
a data type "Channel", framed by 'DATA TYPE Channel' and 'END DATA TYPE Channel',
a data type "Stream", framed by 'DATA TYPE Stream' and 'END DATA TYPE Stream',
a data type "PriorityQueue", framed by 'DATA TYPE PriorityQueue' and 'END DATA TYPE PriorityQueue'.

The implementation part consists of
a process "Receive", framed by 'PROCESS Receive' and 'END PROCESS Receive', and
a process "Stream" framed by 'PROCESS Stream' and 'END PROCESS Stream',
a class "Estimation", framed by 'CLASS Estimation' and 'END CLASS Estimation'.

The data type "Channel" consists of
a method "End", returning the Boolean true if the input packet sequence ends, and
a method "Fetch", returning the next arrived packet.

The data type Stream has also two methods:
a method "Append", adding a data element at the end of this stream, and
a method "Read", returning the next element of the stream.

The data type "PriorityQueue" has four methods:
a method "Add", adding a packet to this priority queue
a method "Get", returning and removing the packet with the least element, i.e. the packet with the least number, from this priority queue,
a method "IsEmpty", returning the Boolean true if the priority queue contains no packet,
a method "Size", returning an integer, the number of packets contained in this priority queue.

The process "Receive" consists of a loop, framed by 'WHILE' and 'END WHILE', with the terminating condition 'NOT Input.End( )', and a body consisting of the statement sequence 'packet=Input.Fetch( )'; 'Estimation.Measure (packet)'; 'Buffer.Add(packet)'.

Hence, the process iterative reads a packet from the input channel, update the performance statistic of the network and buffers the packet, until the last packet is arrived.

The process "Stream" consists of a main loop, framed by 'WHILE' and 'END WHILE', with the terminating condition 'NOT (Input.End( ) AND Buffer.isEmpty( ))' and a body consisting of the statement 'Estimation.Predict(BufferSize, DelayTime)' followed by a sequence of further while loops.

The first while loop, framed by 'WHILE' and 'WAIT END WHILE' has the terminating condition 'Buffer.Size( )<BufferSize' waits until the buffer is filled according to the predicted value Buffer.Size.

The second while loop, framed by 'WHILE' and 'END WHILE', with the terminating condition 'NOT Buffer.isEmpty( )' and a body consisting of the statement sequence 'Output.Append(Buffer.Get( ))'; 'DELAY(DelayTime)', empties the buffer and serves the stream continuously with a homogenous by the Estimation predicted delay.

The latter two loops are iterated until the complete stream is reconstructed.

The kernel of the described program and the control of the processes and the buffer is the class "Estimation". This class contains the variable "meanDelay". In general this class contains variables for measured network characteristics.

Furthermore, the class "Estimation" consists of a set of variables for the statistical observations and two methods,
a method "Measure" that updates the network characteristics by observed events, here a packet arrival, and
a method "Predict", that returns parameters for the conversion, here BufferSize and DelayTime, based on gathered network characteristics. It should be noted that the methods of the two processes are only a specific option model. Beside the stated mode there might be a streaming handshake, forcing faster streams, or an application that might allow a homogenous delay or a smooth increasing delay.

FIG. 6 shows a program implementing a class Estimation introduced in FIG. 5.

The class "Estimation" is framed by 'CLASS Estimation' and 'END CLASS Estimation' and contains five variables, three reals "T", "sr", and "tr", as well as two integers "R" and "n", and two methods.
A method "Measure" that updates the mean delay T by an observed packet delay t, as well as the decrement of the number of remaining packets R and
A method "Predict", that returns parameters for the conversion, buffer size B and delay time (the reciprocal of the sample rate), based on gathered network characteristics.

Figure 7:
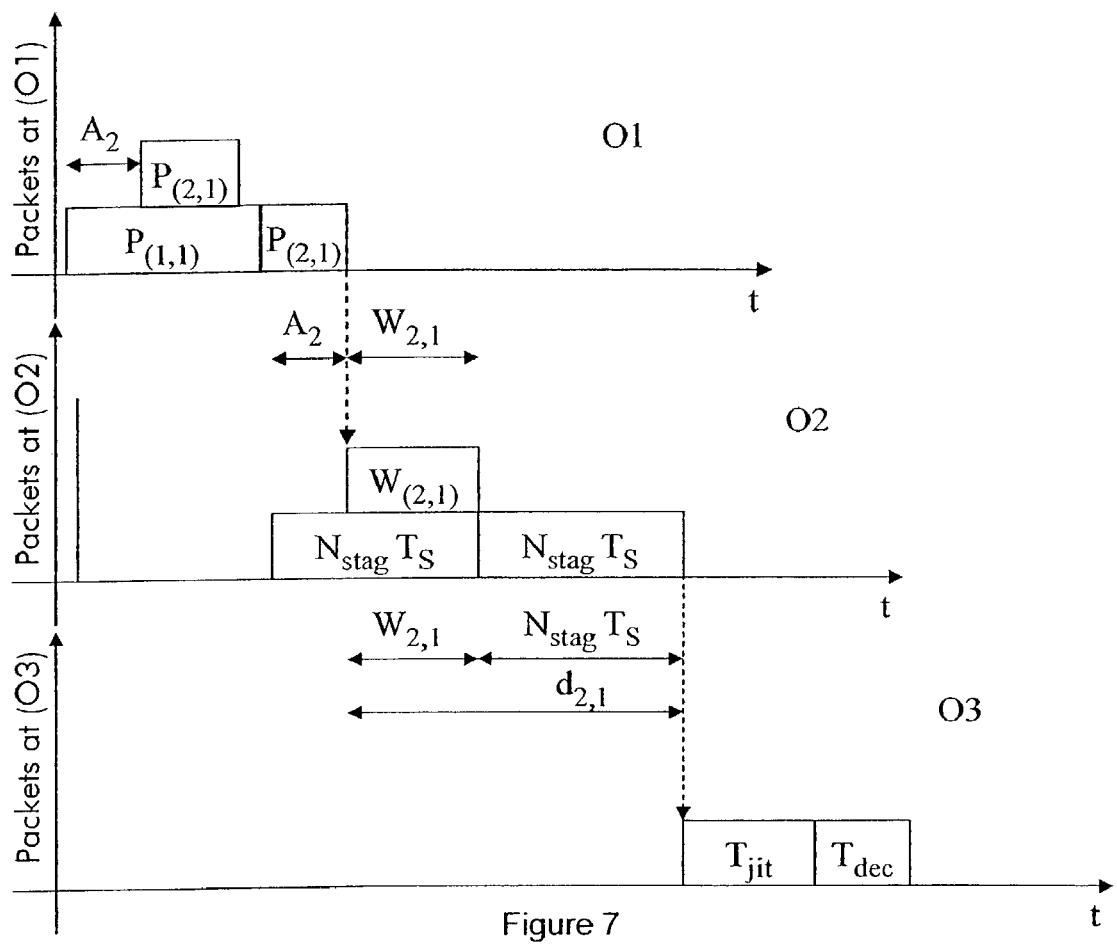
FIG. 7. shows a timeline of a encoding—transportation—decoding delay scenario.

FIG. 7 shows three diagrams, labeled by O1, O2, and O3. The x-axis of each diagram is the time and the y-axis are packets. Diagram O1 shows encoding and packetisation, diagram O2 shows transportation through a network, and diagram O3 shows the stream resuming at the receiver. The figure depicts an encoding-transmission-decoding scenario. There are three observation points O1 at the sender, O2 at the network, and O3 at the receiver.

Diagram O1 consists of a packet $P_{(1,1)}$ and two occurrences of packet $P_{(2,1)}$. Diagram O2 consists of a waiting packet $W_{(2,1)}$ and two total service time intervals $N_{stag} T_S$ for each packet. Diagram 03 consists of a de-jittering delay $T_{jit}$ and a decoding delay $T_{dec}$.

The diagrams are connected via three dashed arrows showing a path of packet $P_{(2,1)}$.

The horizontal double arrows $A_2$ shows a time interval until packet $P_{(2,1)}$ arrives. The horizontal arrow $W_{2,1}$ shows a waiting time interval of packet $P_{(2,1)}$. A horizontal arrow $N_{stag} T_S$ shows a service time interval of $P_{(2,1)}$, and a horizontal arrow $d_{2,1}$ shows a delay of packet $P_{(2,1)}$.

Assumptions for the shown scenario are identical encoding (e.g. Voice Activity Detection or not) and packetisation of the arriving calls, with no time stamps and available packet sequence numbers. Negative-exponentially distributed connection inter-arrival time $A_2$ is assumed at the encoder. Shown in diagram O2 a packet-based network delays discontinuously packets with a deterministic service time $N_{stag} T_S$. No priorities, no retransmission, no overtaking, no change in routing, only real-time traffic, and no disturbing data traffic is assumed.

The packet $P_{(2,1)}$ is traced through the described scenario. At the sender this packet is created after the time $A_2$ starting from the creation event of the preceding packet $P_{(2,1)}$. When the first packet is processed the packet $P_{(2,1)}$ enters the network. There it waits for the time $W_{2,1}$. When the waiting time is passed the network transports the packet within time $N_{stag\ TS}$ to the receiver. At the receiver it is buffered for a time $T_{jit}$ and decoded within a time $T_{dec}$.

Figure 8:
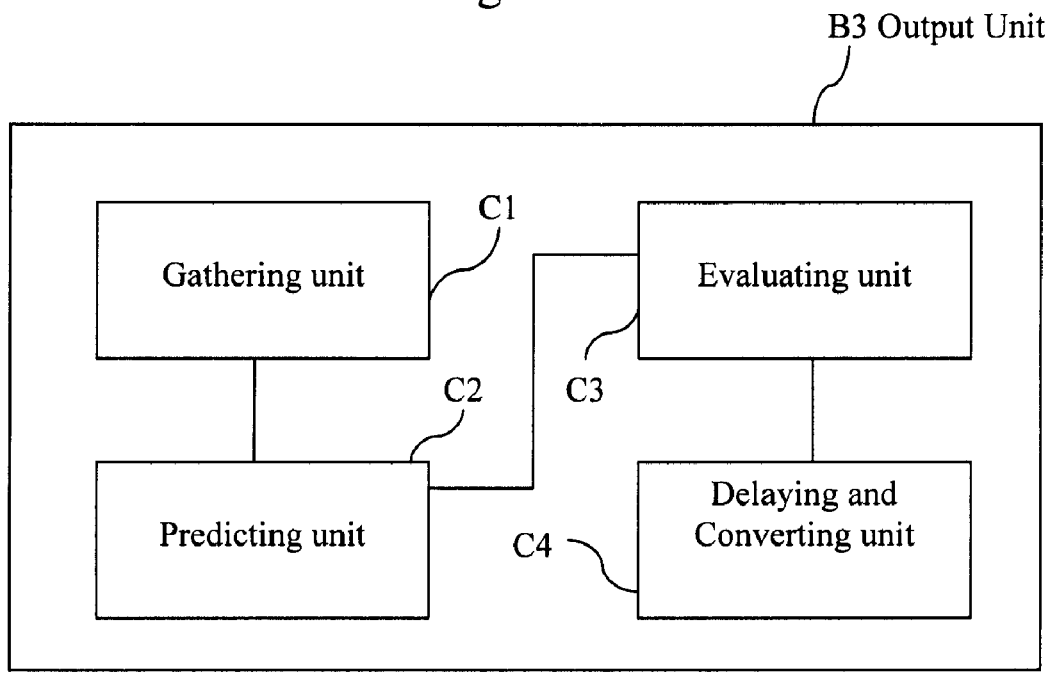
FIG. 8. shows the output unit of FIG. 1 according to an exemplary embodiment of the present invention.

FIG. 8. shows the output unit B3 of FIG. 1 according to an exemplary embodiment of the present invention.

As shown in FIG. 8, the output unit B3 may include a gathering unit Cl, a predicting unit C2, an evaluating unit C3, and a delaying and converting unit C4.

Figure 9:
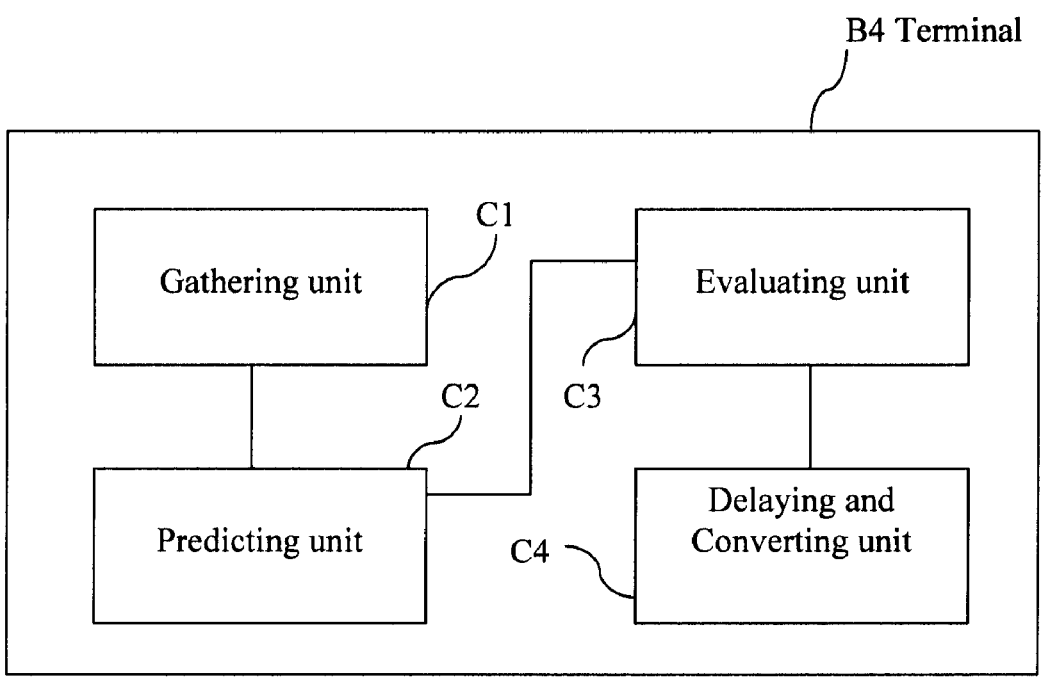
FIG. 9. shows the terminal of FIG. 1 according to an exemplary embodiment of the present invention.

FIG. 9. shows the terminal of FIG. 1 according to an exemplary embodiment of the present invention.

As shown in FIG. 9, the terminal B4 may include a gathering unit Cl, a predicting unit C2, an evaluating unit C3, and a delaying and converting unit C4.

The following section contains an example application for a stream transmission scenario where a size of a file to stream is known and a network that delays equally sized packets equally. Then considering the following intermediate scenario enabling one to determine the optimal buffer size for continuous streaming, i.e., the following three events coincide: buffer is empty, the file is completely transmitted, and the buffer is completely streamed. Because of the deterministic delay assumption there is no need for prediction. But the example shows the dependence of the scenario parameters and illustrates the adaptive buffer functionality.

In an intermediate scenario there is a rest of the stream to transmit at the sender, called rest, of size R, a buffered stream, called buffer, of size B and a played stream at the sender. The above three events coincide when the transmission time for the rest and the time for streaming the rest and buffer is equal. The transmission rate tr is 1/T, the stream rate is a constant, say sr. Then the transmission time for the rest is R/tr and the time for streaming the rest and buffer is (R+H)/sr. Derived from the equation R/tr=(R+B)/sr one concludes the optimal buffer size B=sr/tr*R−R.

For most packet networks the assumption that each packet is delayed equally is wrong. But one could approximate the real delay with the mean delay of the already transmitted packets instead. The mean delay T(n) for n transmitted packets each having its own delay $t_i$ is the sum delay $t_1+t_2+\ldots+t_n$ divided by n. For calculation T(n+1) consider $T(n+1)=(t_1+t_2+\ldots+t_n+t_{n+1})/(n+1)=((t_1+t_2+\ldots+t_n)+t_{n+1})/(n+1)$, but $(t_1+t_2+\ldots+t_n)=n*T(n)$. Hence $T(n+1)=(n*T(n)+t_{n+1})/(n+1)$.

The above discussion is illustrated as an implementation of class 'Estimation' shown in FIG. 6.

The statistical model can be enhanced by observable properties of the network like packet routing, traffic, or network topology, and of the stream content itself, like length pauses and talk spurts in the case of voice data streams, as well as past transmissions or even past connections. The following section describes a more complex application for the special case of reducing delay jitter for a packetized voice network, with minimal delay, i.e., small queues in the context and with the assumptions of FIG. 6. A set of recursive measurement and prediction equations, based on multiple probabilistic models is developed illustrating the claimed method. The main assumptions are a constant inter-arrival time for the packets at the network during active voice, but no constant inter-departure time when arriving at the receiver.

For this application additionally a probability function which describes the network packet delay behaviour is missing. The delay of the first arriving packet (reference packet) $d_{ref}$ is unknown, as well as the sender clock is unknown and the time stamps are unavailable. The application has the property to be able re-configuring the queue while silence phases. Hence this application is an example for a tight coupling of the application layer consuming the transmitted stream.

For the detailed description the following notations are used for the encoding and packetisation delay factors
frame size $T_F$
encoder processing time $T_{enc}$
look ahead $T_{LA}$
$N_F$ code words per packet
inter-packet time $N_F T_F$
decoder processing delay $T_{dec}$ and for the network delay factors
inter-packet time $N_F T_F$
service time per node and packet $T_S$
number of traversed nodes $N_{stag}$
total service time $N_{stag} T_S$
statistical waiting time $W_N$ For the end-to-end delay we say the delay introduced by encoder, packetizer and decoder: $T_{enc,P,dec}=N_F T_F+T_{LA}+T_{enc}+T_{dec}$, for the delay in the packet-based network: $D=N_{stag}T_S+W_N$, and for the dejittering delay: $T_{jit}$.

The initial values for the statistical model are
the maximum end-to-end delay is $d_{E2E}$,
the number of traversed nodes $N_{stag}$,
the service time per node $T_S$,
the mean number of created packets per call is $\bar{x}$ calculated out of the mean call holding time
calls per second (dependent on daytime)
packet frame length $T_F$
number of packets per frame $N_F$ The assumed/pre-defined statistical values are
Number of overall competing connections $N_{IP}$
Number of route busy periods M
Number of competing connections per busy period $n_m$ The following section contains notations used for the described packet delay calculations.

Amount of packets from calls arriving after the observed connection i until network arrival instant of packet number r. $x_{k_m+i,r}^{min(p_r)}$.

Number of additional packet arrivals of previous connections between $1^{th}$ connection arrival instant and network arrival instant of packet r from connection i: $x_{k_m+i,r}^{min}$.

Probability of j Poisson arrivals during packet producing time interval of a single connection:

$$p_{j,r} = \frac{(\lambda(r-1)N_F T_F)^j}{j!} e^{-\lambda(r-1)N_F T_F}.$$

The following section contains an itemization of the used notations for mean delay calculations Mean delay of an arbitrary packet: $\bar{d}(N_{stag}, T_S, \bar{x}, \lambda, N_F T_F)$ Mean absolute relative delay of an arbitrary packet: $\overline{\Delta d}(N_{stag}, T_S, \bar{x}, \lambda, N_F T_F)$ Mean delay of the $r^{th}$ packet $\bar{d}_r(N_{stag}, T_S, \bar{x}, \lambda, N_F T_F)$ Average number of cumulative network packet arrivals at network arrival instant of packet number r. $\bar{q}_r(\bar{x}, N_{IP}, \bar{x}_r^{min}, \bar{x}_r^{min(p_r)})$ and of an arbitrary packet: $\bar{q}(\bar{x}, N_{IP}, x^{min}, x^{min(p)})$.

Average relative number of cumulative network packet arrivals at network arrival instant of packet number r. $\overline{\Delta q}_r(x^{min(p_r)})$ and of an arbitrary packet: $\overline{\Delta q}(\bar{x}, x^{min(p)})$.

Average minimum amount of additional packets from previous connections at network arrival time instant of packet number r. $\overline{x_r^{min}}(\bar{x}, \lambda, N_F T_F)$ and of an arbitrary packet: $\overline{x^{min}}(\bar{x}, \lambda, N_F T_F)$.

Average minimum amount of additional packets from calls arriving after the observed connection until network arrival instant of packet number r. $\overline{x_r^{min(p_r)}}(\bar{x}, \lambda, N_F T_F)$ and an arbitrary network packet arrival instant: $\overline{x^{min(p)}}(\bar{x}, \lambda, N_F T_F)$.

Mean total inter-arrival time of an arbitrary packet: $\bar{I}(\lambda, \bar{x}, N_F T_F)$ the $l^{th}$ call: $\bar{I}_{i-l}(\lambda, \bar{x}, N_F T_F)$, and the $r^{th}$ packet: $\bar{I}_r(\lambda, N_F T_F)$.

Mean value of $N_{IP}$ Erlang-(i-1) distributed time intervals: $\bar{Y}(\lambda)$ Mean values of the relative absolute total inter-arrival time of an arbitrary packet: $\overline{\Delta I}(\lambda, \bar{x}, N_F T_F)$ the $l^{th}$ call: $\overline{\Delta I_{i-l}}(\lambda, \bar{x}, N_F T_F)$, and the $r^{th}$ packet: $\overline{\Delta I_r}(\lambda, N_F T_F)$.

The following list contains the set of values for initialisation and adaptation.

Packet arrival instants at the decoder: $t_{D_r}$

Delay of the $r^{th}$ packet: $d_r$

Reference packet number ref, which is the number of the first arriving packet

QoS dejittering delay: $T_{jit}$

Packet loss probability: $P_{loss}$

Maximum allowed end-to-end delay: $d_{E2E}$

Number of packets per active voice period $x_{k_m+i}$

Number of packet losses $x_{loss}$

Number of overlong delays $x_{E2E}$

Coefficient of variation c

Hypo-exponential Process $F_D(t; t_1, t_2)$ with mean values $t_1$ and $t_2$.

Hyper-exponential Process $F_D(t, p, t_1, t_2)$ with the mean values $t_{1,2}$ and probability p.

We have two qualities of service bounds, the packet loss restriction $Pr[d > d_{min} + T_{jit}] < P_{loss}$, and the delay restriction $d_{max} + T_{jit} < d_{E2E}$.

The problem of serving continuous streamed voice data is solved by gathering the decoder packet arrival instants $t_{D_{ref}}$ and $t_{D_r}$; then approximating the delay of the first arriving packet $d_{ref}$ with a pre-calculated mean delay value and calculating the delay of the $r^{th}$ packet out of $d_r = t_{D_r} - t_{D_{ref}} + \bar{d} - (r-ref) \cdot N_F T_F$, and creating a substitute delay probability function to calculate the maximum tolerated packet delay and consequently the dejittering delay.

Packets missing the quality of service restrictions for packet loss $d_r \leq t_{D_r} - t_{D_{ref}} + \bar{d} - (r-ref) \cdot N_F T_F$, or equivalently $t_{D_r} \leq t_{D_{ref}} + T_{jit} + (r-ref) \cdot N_F T_F$ and the end-to-end delay $d_r + T_{jit} < d_{E2E}$ are discarded.

The following section contains the variables needed for packet delay calculations.

The delay of the $r^{th}$ packet produced from the $l^{th}$ connection during busy period m is denoted as $d_{k_m+i,r}$.

$W_{k_m+i,r}$ denotes the waiting time of packet number $k_m+i,r$.

$I_{i-l,r}$ describes the total inter-arrival period from the begin of route busy period m until network arrival instant of the $r^{th}$ packet of the $l^{th}$ connection. The total number of network packet arrivals from the beginning of the busy period m until service beginning of the observed packet is named $q_{k_m+i,r}$ i $-1+r-1++x_{k_m+i,r}^{min(p_r)} + x_{k_m+i,r}^{min}$.

$Y_{1-1}$ is the Erlang distributed time interval of i-1 negative-exponentially distributed successive call inter-arrival time intervals.

$\Delta I_{i-l,r}$ denotes the relative total inter-arrival time of the $r^{th}$ packet produced from the $l^{th}$ call.

The negative-exponentially distributed encoder inter-arrival time of the $l^{th}$ connection is named $A_{k_m+l}$.

The following section contains a description sample jitter delay algorithm for voice data streams.

This prediction is based on gathered the decoder packet arrival instants $t_{D_{ref}}$ and $t_{D_r}$; via an approximated delay of the first arriving packet $d_{ref}$ with a pre-calculated mean delay value and calculate the delay of the $r^{th}$ packet out of $d_r = t_{D_r} - t_{D_{ref}} + \bar{d} - (r-ref) \cdot N_F T_F$; and a substitute delay probability function to calculate the maximum tolerated packet delay and consequently the dejittering delay.

There are two quality of service bounds considered, namely, the packet loss restriction $Pr[d > d_{min} + T_{jit}] < P_{loss}$ and the delay restriction $d_{max} + T_{jit} < d_{E2E}$.

The "Measure" method for this example initializes the statistic observations by gathering the following values during call set-up the maximum end-to-end delay $d_{E2E}$ the highest tolerated probability for packet loss due to jitter problems $P_{loss}$ the number of traversed nodes $N_{stag}$ the service time per node $T_S$ the mean number of created packets per call $\bar{x}$ calculated out of the mean call holding time calls per second (dependent on daytime)

packet frame length $T_F$ number of packets per frame $N_F$ for the (initial) service time $N_{stag} T_S$ the packet length $N_F T_F$ the initial mean delay of an arbitrary packet $\bar{d}^{(0)} := \bar{d}(N_{stag}, T_S, \bar{x}, \lambda, N_F T_F)$ the initial mean absolute relative delay of an arbitrary packet $\overline{\Delta d}^{(0)} := \overline{\Delta d}(N_{stag}, T_S, \bar{x}, \lambda, N_F T_F)$ the initial coefficient of variation $$c^{(0)} = \frac{\overline{\Delta d^{(0)}}}{\bar{d}^{(0)}}$$

to determine the initial delay probability function.

While the call is active the "Measure" method gathers the packet arrival instants $t_{D_r}$. Then the delay of the $r^{th}$ packet by $d_r = t_{D_r} - t_{D_{ref}} + \bar{d}^{(0)} - (r-ref) \cdot N_F T_F$ is calculated. The quality of service restriction for streamed voice data are for packet loss requirement $t_{D_r} \leq t_{D_{ref}} + T_{jit}^{(0)} + (r-ref) N_F T_F$ and for delay requirement $d_r + T_{jit}^{(0)} < d_{E2E}$. For the shown statistical description it is necessary to count the number packets per active voice period $x_{k_m+i}$, packet losses $x_{loss}$, and overlong delays $x_{E2E}$.

The route length $N_{stag}$ and the service time $N_{stag}T_S$ as well as the mean delay $$\overline{d^{(q)}} := \overline{d^{(q-1)}} + \frac{1}{x_{k_m+i}} \sum_{r=2}^{x_{k_m+i}} t_{D_r} - t_{D_{r-1}} - N_F T_F,$$

and the mean value of the relative absolute delay $$\overline{\Delta d^{(q)}} := \overline{\Delta d^{(q-1)}} + \frac{1}{x_{k_m+i}} \sum_{r=2}^{x_{k_m+i}} |t_{k_m+i,r} - t_{k_m+i,ref} - (r - ref) N_F T_F|,$$

and the coefficient of variation $$c^{(q)} = \frac{\overline{\Delta d^{(q)}}}{\overline{d^{(q)}}}$$

s updated during a talk spurt.

In "Prediction" method one calculate $d_{max}^{(q)}$ choosing the Hypo-exponential probability $F_D(t; t_1^{(q)}, t_2^{(q)})$ function when $0 \leq c^{(q)} \leq 1$, where $t_1^{(q)} = \overline{d^{(q)}} \cdot (1-c^{(q)})$ and $t_2^{(q)} = \overline{d^{(q)}} \cdot c^{(q)}$. And calculate $d_{max}^{(q)}$ from probability function with respect to packet loss probability out of $d_{max}^{(q)} = F_D^{-1}(1-P_{loss}; t_1^{(q)}, t_2^{(q)})$ If $c^{(q)} > 1$ choose the Hyper-exponential probability function $F_D(t; p^{(q)}, t_1^{(q)}, t_2^{(q)})$, where $$t_{1,2}^{(q)} = \overline{d^{(q)}} \cdot \left(1 \pm \sqrt{\frac{(c^{(q)})^2 - 1}{(c^{(q)})^2 + 1}}\right)^{-1}$$

and $p^{(q)} = \overline{d^{(q)}} / 2 \cdot t_1^{(q)}$. Calculate the maximum relative delay $d_{max}^{(q)}$ out of the Hyper-exponential probability density function with e.g. the decomposition method.

The result is used to adapt the stream output respectively by the maximum relative delay:

$\Delta d_{max}^{(q)} := d_{max}^{(q)} - d_{min} = d_{max}^{(q)} - N_{stag}T_S$ and determine $T_{jit}^{(q)}$ according to $\Delta d_{max}^{(q)} =: T_{jit}^{(q)} \leq d_{E2E} - d_{max}^{(q)}$ during a silence period.

The delay of the $r^{th}$ packet of the $l^{th}$ connection during busy period m is the sum of its service time and its waiting time in the network: $d_{k_m+i,r} = N_{stag}T_S + W_{k_m+i,r}$.

The waiting time summarises the complete busy period until packet number $k_m+i$, starts being serviced and reduces it with the time interval $I_{i-l,r}$: $W_{k_m+i,r} = N_{stag}T_S \cdot q_{k_m+i,r} - I_{i-l,r}$: $I_{i-l,r}$ starts at the beginning of the busy period until the $r^{th}$ packet network arrival instant: $I_{i-1,r} = Y_{i-l} + (r-1) N_F T_F$, where $Y_{i-l}$ denotes an Erlang distributed time interval.

The total number of network packet arrivals from the begin of the busy period m until service begin of the observed packet is $q_{k_m+i,r}$.

The total inter-arrival time of the $r^{th}$ packet of the $l^{th}$ call is $I_{i-l,r} = Y_{i-l} + (r-1) N_F T_F$ The relative total arrival time of the $r^{th}$ packet of the $l^{th}$ call is $\Delta I_{i-l,r} = (r-1) N_F T_F$ The number of $l=1, \ldots, j$ and $j=1, \ldots$ competing packet arrivals between $l^{th}$ connection arrival instant and network arrival instant of packet r from connection l is $$x_{k_m+i+l,r}^{min(p_{j,r})} = \min\left\{\overline{x}; r - \left\lfloor \frac{Y_{l-1}}{N_F T_F} \right\rfloor\right\}.$$

The number of additional packet arrivals of previous connections between $l^{th}$ connection arrival instant and network arrival instant of packet r from connection j ($j=2, \ldots, i$) is $$x_{k_m+j-1,r}^{min} = \min\left\{\overline{x} - 1; \left\lfloor \frac{Y_{i-j+1}}{N_F T_F} \right\rfloor + r - 1\right\}.$$

The amount of additional packets from calls arriving after the observed connection i until network arrival instant of packet number r is $$x_{k_m+i,r}^{min(p_r)} = \sum_{j=1}^{\infty} p_{j,r} \sum_{l=1}^{j} x_{k_m+i+l,r}^{min(p_{j,r})}.$$

Number of additional packet arrivals of previous connections between $l^{th}$ connection arrival instant and network arrival instant of packet r from connection i is $$x_{k_m+i,r}^{min} = \sum_{j=2}^{j} x_{k_m+j-1,r}^{min}.$$

The Erlang distributed time interval $Y_{i-l}(\lambda) = \Sigma_{k=l}^{i-l} A_k(\lambda)$ is calculated by composition technique out of i−1 negative-exponentially distributed successive inter-arrival time intervals by generating $U_1, U_2, \ldots, U_{i-1}$ (mutually) independent and uniformly distributed between 0 and 1, $$Y_{i-1}(\lambda) = -\frac{1}{\lambda} \ln(U_1 \cdot U_2 \ldots U_{i-1}).$$

$p_{j,r}$ is the probability of j Poisson arrivals during packet producing time interval $(r-1) N_F T_F$ of connection l, hence $$p_{j,r} = \frac{(\lambda(r-1)N_F T_F)^j}{j!} e^{-\lambda(r-1)N_F T_F}.$$

The mean delay of an arbitrary packet is $\overline{d} = N_{stag}T_S + \overline{w} = N_{stag}T_S + N_{stag}T_S \cdot (\overline{x} - 1 + \overline{q}) - \overline{I}$.

The mean delay of the $r^{th}$ packet is $\overline{d_r} = N_{stag}T_S + \overline{w_r} = N_{stag}T_S + N_{stag}T_S \overline{q_r} - \overline{I_r}$.

The mean absolute relative delay of an arbitrary packet $\overline{\Delta d} = \overline{\Delta w} = |N_{stag}T_S \cdot \overline{x} \cdot \overline{\Delta q} - \overline{\Delta I}|$.

The mean delay of an arbitrary packet is the average over all $N_{IP}$ packet delays observed during m=1, ..., M busy periods:

$$\bar{d} = \frac{1}{\bar{x} \cdot N_{IP}} \sum_{r=1}^{\bar{x}} \sum_{m=1}^{M} \sum_{i=1}^{n_m} d_{k_m+i,r} = \frac{1}{\bar{x}} \sum_{r=1}^{\bar{x}} \bar{d}_r = N_{Stag} T_S + \frac{1}{\bar{x}} \sum_{r=1}^{\bar{x}} \bar{w}_r$$

$$= N_{stag} T_s + N_{stag} T_s \cdot \frac{1}{\bar{x}} \sum_{r=1}^{\bar{x}} \bar{q}_r - \frac{1}{\bar{x}} \sum_{r=1}^{\bar{x}} \bar{I}_r$$

$$= N_{stag} T_S + \bar{w} = N_{stag} T_S + N_{stag} T_s \cdot (\bar{x} - 1 + \bar{q}) - \bar{I}.$$

The mean delay of the $r^{th}$ packet is the average over all $$N_{IP} = \sum_{m=1}^{M} (n_m) r^{th}$$

packet delays observed during m=1, ..., M busy periods $$\bar{d}_r = \frac{1}{N_{IP}} \sum_{m=1}^{M} \sum_{i=1}^{n_m} d_{k_m+i,r} = N_{stag} T_s + \frac{1}{N_{IP}} \sum_{m=1}^{M} \sum_{i=1}^{n_m} W_{k_m+i,r}$$

$$= N_{stag} T_s + \frac{1}{N_{IP}} \sum_{m=1}^{M} \sum_{i=1}^{n_m} N_{stag} T_s \cdot q_{k_m+i,r} - \frac{1}{N_{IP}} \sum_{m=1}^{M} \sum_{i=1}^{n_m}$$

$$= N_{stag} T_s + \bar{w}_r = N_{stag} T_s + N_{stag} T_s \cdot \bar{q}_r - \bar{I}_r$$

The mean absolute relative delay of an arbitrary packet is the average over all $\bar{x} \cdot N_{IP}$ relative absolute packet delays observed during m=1, ..., M busy periods is given by $$\overline{\Delta d} = \frac{1}{\bar{x} \cdot N_{IP}} \sum_{r=1}^{\bar{x}} \sum_{m=1}^{M} \sum_{i=1}^{n_m} |d_{k_m+i,r} - d_{k_m+i,1}| =$$

$$= \frac{1}{\bar{x}} \sum_{r=1}^{\bar{x}} \overline{\Delta d_r} = \frac{1}{\bar{x}} \sum_{r=1}^{\bar{x}} \overline{\Delta w_r} = \left| N_{stag} T_s \cdot \frac{1}{\bar{x}} \sum_{r=1}^{\bar{x}} \overline{\Delta q_r} - \frac{1}{\bar{x}} \sum_{r=1}^{\bar{x}} \overline{\Delta I_r} \right|$$

$$= \overline{\Delta w} = |N_{stag} T_s \cdot \bar{x} \cdot \overline{\Delta q} - \overline{\Delta I}|$$

Average number of cumulative network packet arrivals at network arrival instant of packet number r is $\bar{q}_r = r - 1 + 1/2(N_{IP} - 1) + \overline{x_r^{min(p_r)}}$
and for arbitrary network packet arrival instants $\bar{q} = 1/2(\bar{x} - 1) + 1/2(N_{IP} - 1) + \overline{x^{min}} + \overline{x^{min(p)}}$.

Average relative number of cumulative network packet arrivals at network arrival instant of packet number r is $\overline{\Delta q_r} = r - 1 + \overline{x_r^{min(p_r)}}$ and at arbitrary packet arrival instants $$\overline{\Delta q} = \frac{\bar{x}}{\bar{x} - 1} |\bar{q} - \bar{q}_1| = \left| \frac{\bar{x}}{2} - \frac{\bar{x}}{\bar{x} - 1} \overline{x^{min(p)}} \right|.$$

Average minimum amount of additional packets from previous connections at network arrival instant of packet number r $$\overline{x_r^{min}} = 1/N_{IP} \sum_{m=1}^{M} \sum_{i=1}^{n_m} x_{k_m+i,r}^{min}$$

and of an arbitrary packet $$\overline{x^{min}} = 1/\bar{x} \sum_{r=1}^{\bar{x}} \overline{x_r^{min}}.$$

Average amount of additional packets from calls arriving after the observed connection i until network arrival instant of packet number r is $$\overline{x_r^{min(p_r)}} = 1/N_{IP} \sum_{m=1}^{M} \sum_{i=1}^{n_m} x_{k_m+i,r}^{min(p_r)}$$

and an arbitrary network packet arrival instant $$\overline{x^{min(p)}} = 1/\bar{x} \sum_{r=1}^{\bar{x}} \overline{x_r^{min(p_r)}}.$$

Mean total inter-arrival time of an arbitrary packet is $$\bar{I}(\lambda, \bar{x}, N_F T_F) = \frac{1}{N_{IP}} \sum_{m=1}^{M} \sum_{i=1}^{n_m} \overline{I_{i-1}} = \frac{1}{\bar{x}} \sum_{r=1}^{\bar{x}} \overline{I_r} = \bar{Y}(\lambda) + \frac{(\bar{x} - 1)}{2} \cdot N_F T_F$$

and for the $l^{th}$ call:

$$\overline{I_{i-1}}(\lambda, \bar{x}, N_F' T_F) = \frac{1}{\bar{x}} \sum_{r=1}^{\bar{x}} I_{i-1,r} = Y_{i-1}(\lambda) + N_F T_F \frac{(\bar{x} - 1)}{2}$$

and for the $r^{th}$ packet:

$$\overline{I_r}(\lambda, N_F T_F) = \frac{1}{N_{IP}} \sum_{m=1}^{M} \sum_{i=1}^{n_m} I_{i-1,r} = \bar{Y}(\lambda) + N_F T_F \frac{(r - 1)}{2}$$

Mean value of the relative absolute total inter-arrival time of an arbitrary packet:

$$\overline{\Delta I}(\lambda, \bar{x}, N_F T_F) = \frac{1}{N_{IP}} \sum_{m=1}^{M} \sum_{i=1}^{n_m} \overline{\Delta I_{i-1}} = \frac{1}{\bar{x} - 1} \sum_{r=2}^{\bar{x}} \overline{\Delta I_r} = N_F T_F \frac{\bar{x}}{2}$$

and the $i^{th}$ call:

-continued $$\overline{\Delta I_{i-1}}(\lambda, \bar{x}, N_F T_F) = \frac{1}{\bar{x}-1}\sum_{r=2}^{\bar{x}} \Delta I_{i-1,r} = N_F T_F \frac{\bar{x}}{2} = \overline{\Delta I}$$

and the $i^{th}$ packet:

$$\overline{\Delta I_r}(\lambda, N_F T_F) = \frac{1}{N_{IP}}\sum_{m=1}^{M}\sum_{i=1}^{n_m} \Delta I_{i-1,r} = N_F T_F (r-1).$$

The mean value of $N_{IP}$ Erlang-(i−1) distributed time intervals is given by $$\overline{Y}(\lambda) = \frac{1}{N_{IP}}\sum_{m=1}^{M}\sum_{i=1}^{n_m} Y_{i-1}.$$

The Hypo-exponential Process is here used to construct a substitute probability distribution function and consists of a discrete time process D with random variable $T_1$ and mean $t_1 = \bar{d} \cdot (1-c)$ linked with a negative exponential process M with random variable $T_2$ and mean $t_2 = \bar{d} \cdot c$ Ftt O for O<t<tl FD(t;tl 2)=if e-(t) l'2 for t>t, The probability distribution function of the Hyper-exponential Process is used to construct a substitute probability distribution function and is given by $F_D(t, p, t_1, t_2) = 1 - p \cdot e^{-(t/t_1)} - (1-p) \cdot e^{-(t/t_2)}$ with the mean values $$t_{1,2} = \bar{d} \cdot \left(1 \pm \sqrt{\frac{c^2-1}{c^2+1}}\right)^{-1} \text{ and probability } p = \frac{\bar{d}}{2 \cdot t_1}.$$

The invention claimed is:

1. A method for reconstructing non-continuous packetized data of a continuous data stream from a data connection into a reconstructed continuous data stream at a receiving point of a packet-based network, comprising:
   gathering measurements of the data connection,
   predicting at least one value characterizing the data connection based on the gathered measurements using an estimation method,
   evaluating a de-jittering delay for the data connection based on the at least one value characterizing the data connection, and
   delaying and converting data packets of the packetized data based on the evaluated de-jittering delay,
   wherein the estimation method comprises approximating a delay of a first arriving data packet of the packetized data as a pre-calculated mean delay value.

2. An output unit for reconstructing non-continuous packetized data of a continuous data stream into a reconstructed continuous data stream, the output unit comprising:
   means for gathering measurements of the data connection,
   means for predicting at least one value characterizing the data connection based on the gathered measurements using an estimation method,
   means for evaluating a de-jittering delay for the data connection based on the at least one value characterizing the data connection, and
   means for delaying and converting data packets of the packetized data based on the evaluated de-jittering delay,
   wherein the estimation method comprises approximating a delay of a first arriving data packet of the packetized data as a pre-calculated mean delay value.

3. A terminal with output unit for reconstructing non-continuous packetized data of a continuous data stream into a reconstructed continuous packet data stream, the terminal comprising:
   means for gathering measurements of the data connection,
   means for predicting at least one value characterizing the data connection based on the gathered measurements using an estimation method,
   means for evaluating a de-jittering delay for the data connection based on the at least one value characterizing the data connection, and
   means for delaying and converting data packets of the packetized data based on the evaluated de-jittering delay,
   wherein the estimation method comprises approximating a delay of a first arriving data packet of the packetized data as a pre-calculated mean delay value.

4. A non-transitory computer readable medium storing thereon a computer program product including software code portions for performing the method of claim 1 for a terminal.

5. A non-transitory computer readable medium storing thereon a computer program product including software code portions for performing the method of claim 1 for an output unit.

6. The method according to claim 1, wherein the gathered measurements comprise packet inter-arrival times.

7. The method according to claim 1, wherein the gathered measurements comprise variation of packet inter-arrival times.

8. The method according to claim 1, wherein a network description and routing information are used for said predicting said at least one value characterizing the data connection.

9. The method according to claim 1, wherein an initialization is performed based on measurements of first data packets of the packetized data.

10. The method according to claim 1, wherein an initialization is performed based on measurements of the data connection gathered during previous transmissions.

11. The method according to claim 1, wherein an initialization is performed based on measurements of the data connection gathered during previous connections.

12. The method according to claim 1, wherein the estimation method is chosen from among a plurality of different estimation methods based on the gathered measurements.

13. The output unit according to claim 2, wherein the estimation method is chosen from among a plurality of different estimation methods based on the gathered measurements.

14. The terminal according to claim 3, wherein the estimation method is chosen from among a plurality of different estimation methods based on the gathered measurements.

15. The method according to claim 1, wherein a data packet of the data packets is discarded if the data packet does not meet a quality of service restriction for packet loss and an end-to-end data delay limitation.

16. The output unit according to claim 2, wherein a data packet of the data packets is discarded if the data packet does not meet a quality of service restriction for packet loss and an end-to-end data delay limitation.

17. The terminal according to claim 3, wherein a data packet of the data packets is discarded if the data packet does not meet a quality of service restriction for packet loss and an end-to-end data delay limitation.

18. The method according to claim 1, wherein the estimation method further comprises creating a substitute delay probability function.

19. The output unit according to claim 2, wherein the estimation method further comprises creating a substitute delay probability function.

20. The terminal according to claim 3, wherein the estimation method further comprises creating a substitute delay probability function.

* * * * *